(12) United States Patent
Cremonese

(10) Patent No.: US 6,375,080 B1
(45) Date of Patent: Apr. 23, 2002

(54) MULTIPLE PURPOSE TELEPHONE CARD

(76) Inventor: Hank Cremonese, 30 Cornelia St. No. 14, New York, NY (US) 10014

( * ) Notice: Subject to any disclaimer, the term of this patent is extended or adjusted under 35 U.S.C. 154(b) by 0 days.

(21) Appl. No.: 09/413,702

(22) Filed: Oct. 6, 1999

Related U.S. Application Data

(63) Continuation-in-part of application No. 08/898,252, filed on Jul. 22, 1997, which is a continuation-in-part of application No. 08/806,324, filed on Feb. 26, 1997, now abandoned.

(51) Int. Cl.$^7$ .............................................. G06K 19/00
(52) U.S. Cl. ...................................... 235/487; 235/380
(58) Field of Search ................................ 235/487, 380, 235/382; 286/67, 99, 100, 106, 900, 904

(56) References Cited

U.S. PATENT DOCUMENTS 5,503,434 A  *  4/1996  Gunn ........................... 283/67

FOREIGN PATENT DOCUMENTS

GB           2252270    *  8/1992  ........... B24D/15/10

\* cited by examiner

*Primary Examiner*—Karl D. Frech
(74) *Attorney, Agent, or Firm*—Richard L. Huff

(57) ABSTRACT

A telephone calling card with multiple uses. It may be dispensed from a machine or a holding rack. It has a prolonged original lifespan as values may be added to it. It improves accessibility to the visually handicapped as the tactile format may be used in recording information. It improves security as it is in sections, one section of which conceals the PIN when the card in use. A separate security measure takes the form of a sound BRUSH which, when activated, emits a predetermined sound signal which is recognized by the user's card carrier company to allow the card to be activated by the PIN. Foldout panels provide coupons, advertising, or room for adding information. The card has many uses following its use as a telephone calling card. In another embodiment, a strip has a self-adhering coating on its back and contains information on the front which is covered by a peel-off adhesive covering. This strip is intended to be sent to people to allow them to make phone calls to the sender of the strip, which phone calls will be paid for by the sender. In a third embodiment, a card has front and rear panels. The rear panel contains adhesive which is covered by a peelable strip. The front panel contains a sound brush, a PIN, and a magnetic strip for recording information. The sound brush may be on the curved corner of the card. This card contains foldout panels for containing coupons, advertisements, or additional information.

15 Claims, 13 Drawing Sheets

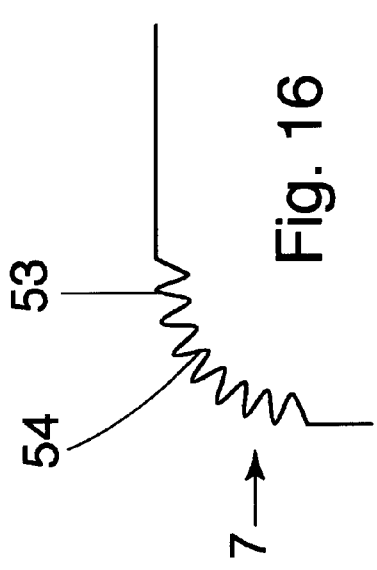
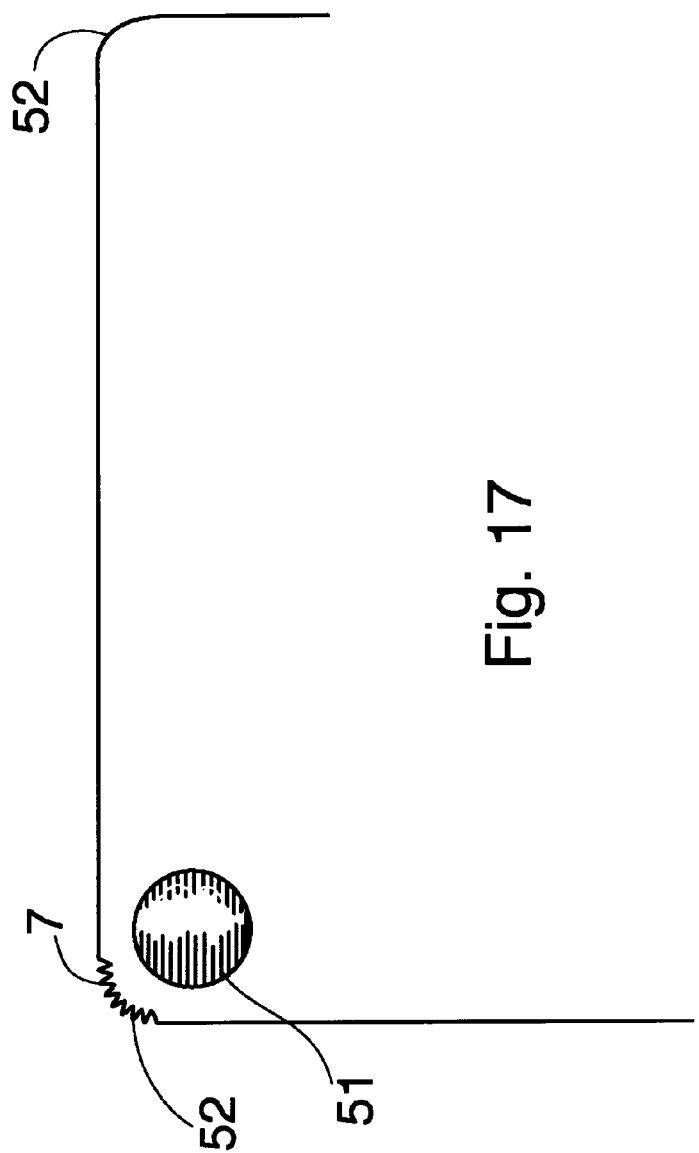

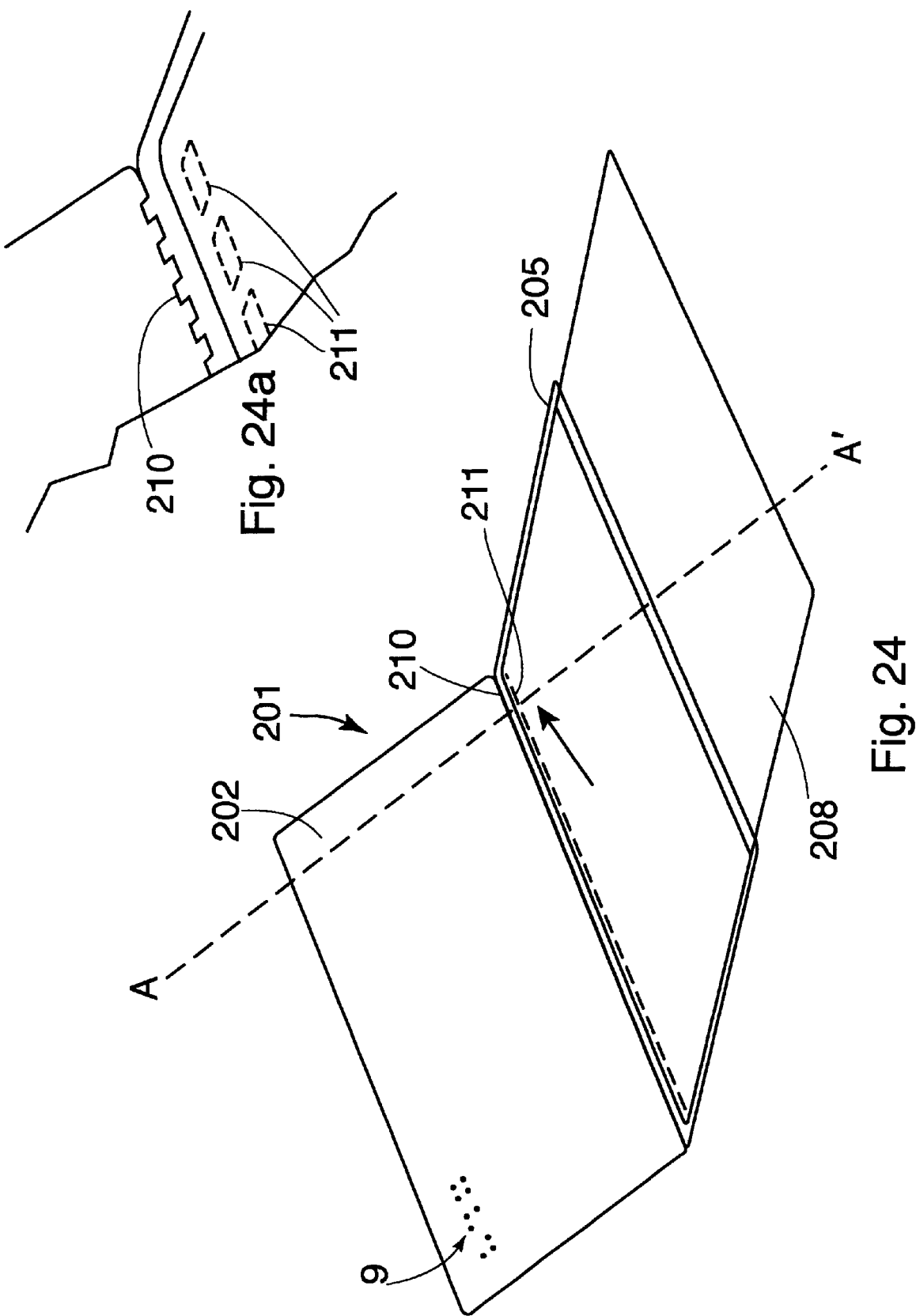

MULTIPLE PURPOSE TELEPHONE CARD

CROSS-REFERENCE TO RELATED APPLICATIONS

This application is a continuation-in-part of application Ser. No. 08/898,252, filed Jul. 7, 1997 which is a continuation-in-part of application, Ser. No. 08/806,324, filed Feb. 26, 1997, now abandoned.

BACKGROUND OF THE INVENTION

1. Field of the Invention

This invention relates to telephone calling cards with increased surface area for information, improved ease of distribution, improved security, increased accessibility to the visually impaired, a multiplicity of uses after their use as telephone calling cards no longer exists, and a means for allowing the receiver of a written communication to contact the sender by telephone at no expense to the receiver.

2. Description of the Related Art The art is aware of telephone calling cards. Such cards may be purchased having a fixed value for making calls from any touch-tone telephone. The typical card is the size and shape of a typical credit card so as to conveniently fit into a card carrying case. Some telephone calling cards, as exemplified by those disclosed in U.S. Pat. Nos. 5,308,121 and 5,503,434 to Gunn, contain expanded surface areas for holding additional identification or other information. Such cards generally are made of plastic, have magnetized tape for an added value of the card, and embossed or printed information on the card. Their increasing popularity and their short lifespan leads to huge amounts of plastic waste material to be discarded each year. While in use, the personal identification number is usually exposed, leading to a compromise of the security of the card. Such cards are virtually useless to the millions of visually handicapped people in the United States who are unable to distinguish conventional printed personal identification marks.

The prior art is also aware of stick-and-peel labels on stick-and-peel sheets, as is exemplified by U.S. Pat. No. 5,165,726 to Tulbott. This patent is concerned with providing return address labels with written correspondence, and is not concerned with providing security measures.

U.S. Pat. No. 5,192,093 to Zeisky et al teaches a card device having a front cover, a back cover, and foldout panels for containing information. This card is difficult to make as it requires a heat seal attachment between the front and rear panels and is not intended to be used as a telephone calling card.

The present invention seeks to overcome the above deficiencies in telephone calling cards while maintaining their beneficial features.

SUMMARY OF THE INVENTION

The telephone card of the present invention shares some of the beneficial features of the prior art cards. It has expanded surfaces for additional information or coupons. These surfaces take the form of foldout panels which fit inside the card when it is not in use. In one embodiment, the card comprises three card panels foldably joined side-by-side. There is at least one sound brush which emits a predetermined sound when activated as by swiping the card across telephone mouthpiece perforations. This predetermined sound operates in combination with the personal identification number to ensure user security. Additional security is provided by the way the card is configured. The personal identification number is viewable only by the user when the card is in use and cannot be seen by a bystander. This added security is accomplished by folding outer panels of the card upwardly so that the personal identification number in the central panel cannot be seen by bystanders. Also, added security is achieved by printing the personal identification number in alternating shades of black and gray making discernment of the personal identification number impossible from a distance. In order to be useful to the visually handicapped, the card has necessary information in tactile form. The card of the present invention may be easily dispensed by machine, dispensed from a cash drawer, or may be displayed on a rack for sale. The card contains a magnetic strip which records additional information. Value may be added to the card by appropriate known methods, thus resulting in a prolonged lifespan for the card. A barometric weather strip which indicates barometric changes by changes in color of the strip may be located on the opposite edge of the card from the magnetized strip or other convenient location. Following its lifespan as a telephone calling card, the card of the present invention contains additional uses due to scoring of the card. One panel contains a V-shaped pattern of scoring, which when opened makes that panel suitable for use as a bookmark. The card of this invention is made of biodegradable vinyl plastic or polyester plastic, paper or cardboard and has an attractive appearance. Thus, a second pattern of scoring which consists of two parallel fines which run parallel to the side edges of a card member results in a band which, along with the remainder of the card, forms a curved opening. This opening can be used to hold hair in the form of pony tails in place. A third pattern of scoring is an X. When opened, this forms a resilient opening which is suitable for the holding of flexible items, like dollar bills or notes. The card has the thickness of a typical telephone card. Each section is made of a bottom cover, a top cover, and a plurality of abutting nibs. This allows for the manufacture of a card of conventional size and strength, yet which contains less material. The result is a card which is less expensive to manufacture. Thus, it may be readily seen that this card has unexpected security, less cost, more space, and accessibility advantages when used as a telephone calling card, and continues to be useful after its use as such.

A card of another embodiment of the present invention may be sent as a secured attachment to a piece of written correspondence. This card provides the receiver with information which prompts a telephone call by the receiver to the sender at no cost to the receiver. This card is made up of a strip of paper, cardboard or vinyl or polyester plastic containing information allowing the receiver to call the sender at no cost to the receiver. This strip is adhered to a piece of correspondence by peeling off a protective strip to expose the self-adherent rear surface of the strip. The information on the front of the strip is secured from view by a self-adhering opaque cover.

A third embodiment of the invention contains a card which is folded into front and rear panels. The outer surface of the rear panel contains a self-adherent adhesive covered by a peelable strip. This allows the card to be attached to correspondence in the manner of the card of the second embodiment. The outer surface of the front panel contains useful information such as personal identification number in printed and tactile form, magnetic strip for retaining a record of information on the card, and a sound brush. Upon unfolding the card, sheets for additional information, advertising, and coupons are accessed.

When finally disposed of the fact that the cards of this invention are made of biodegradable materials rather than non-biodegradable plastic helps reduce the rate of growth of the mountain of waste which is jeopardizing the environment of the United States.

BRIEF DESCRIPTION OF THE DRAWING

FIG. 16 is a top elevational view of a sound brush located at a corner of a card of the present invention.

FIG. 17 is a top elevational view of a closed card of the present invention showing a sound brush located in a corner.

FIG. 24 is an elevational perspective view showing the opened arrangement of a card of the third aspect of this invention and magnified views of abutment lines.

FIG. 24a is an enlargement taken along line A–A' of FIG. 24.

DESCRIPTION OF THE PREFERRED EMBODIMENTS

Figure 1:
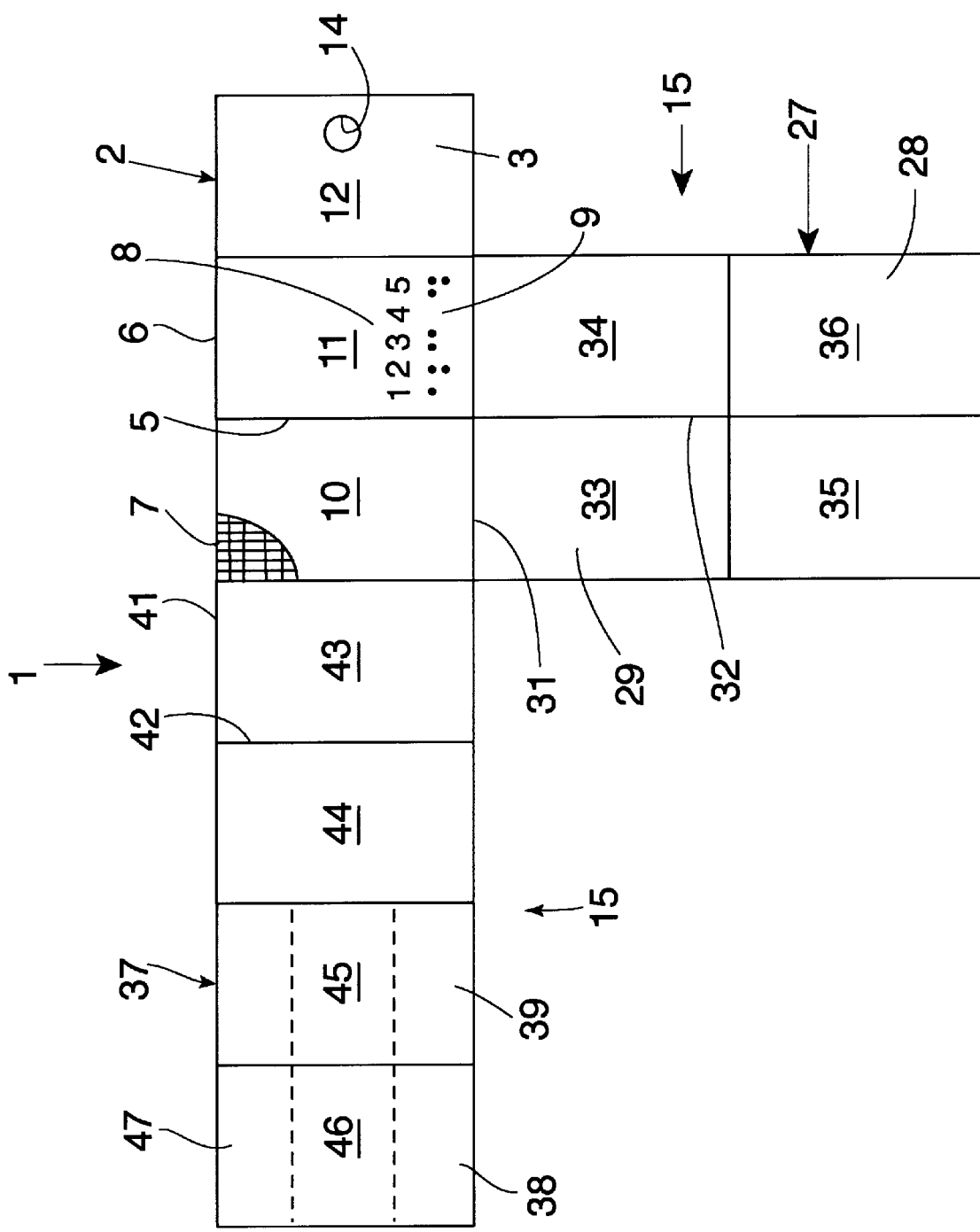
FIG. 1 shows a plan view of the front of the expanded card of the first embodiment of the present invention.
Figure 2:
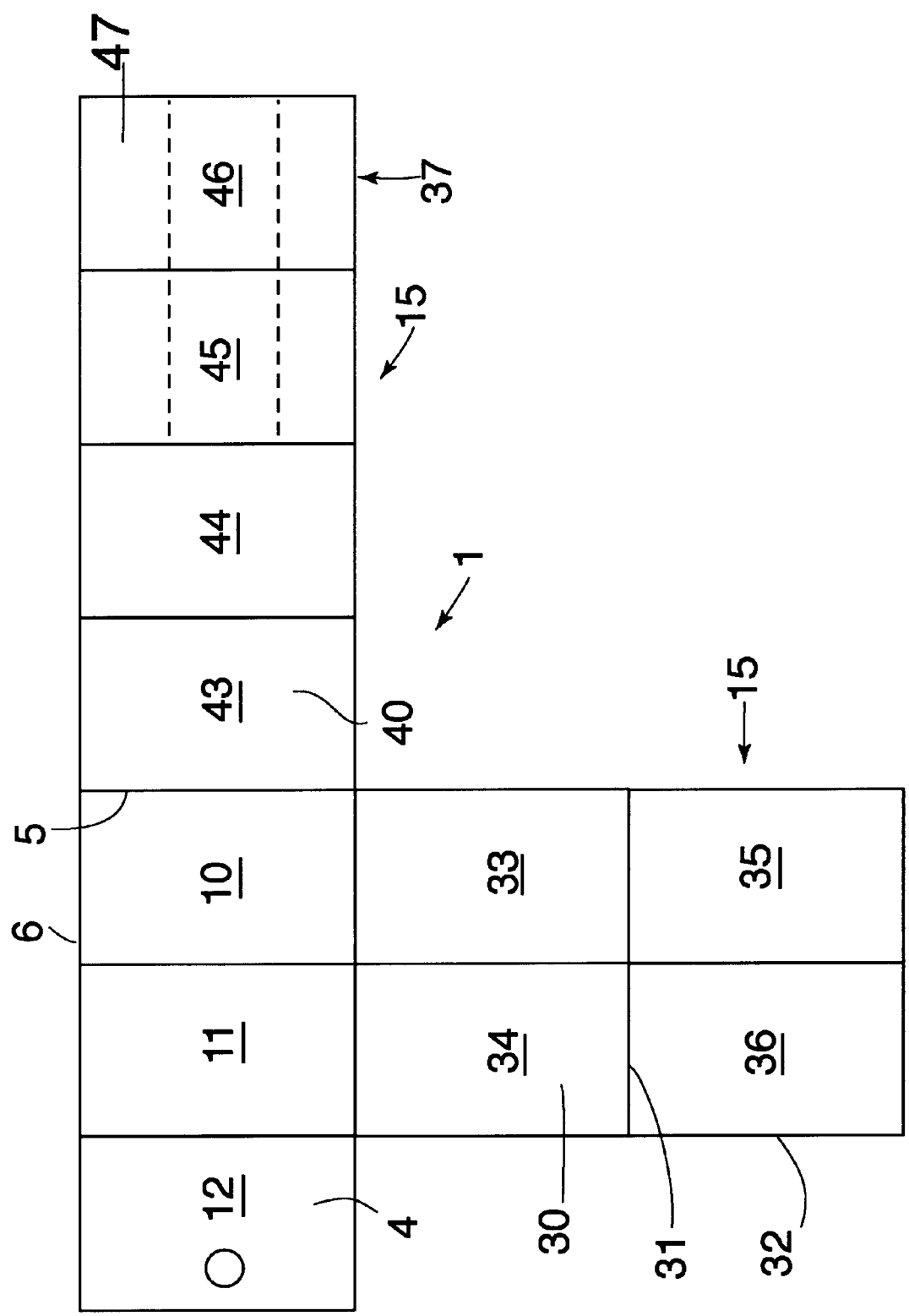
FIG. 2 shows a plan view of the back of the expanded card of the first embodiment of the present invention.
Figure 3:
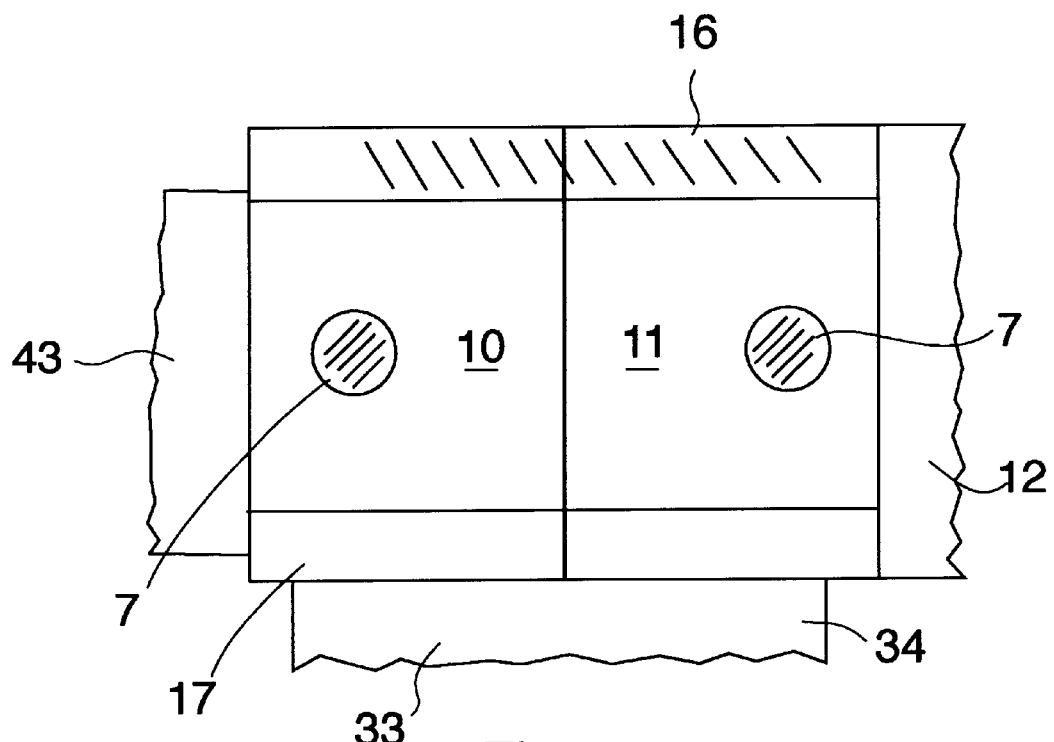
FIG. 3 shows a plan view of the front of first and second card panels of the first embodiment of the invention with a magnetic strip and two sound brushes.
Figure 4:
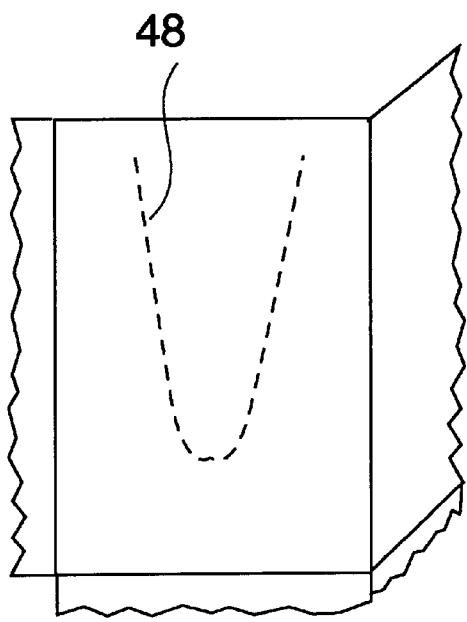
FIG. 4 shows a plan view of the front of the first card panel of a card of the first embodiment of the invention showing a V-shaped perforation pattern.
Figure 5:
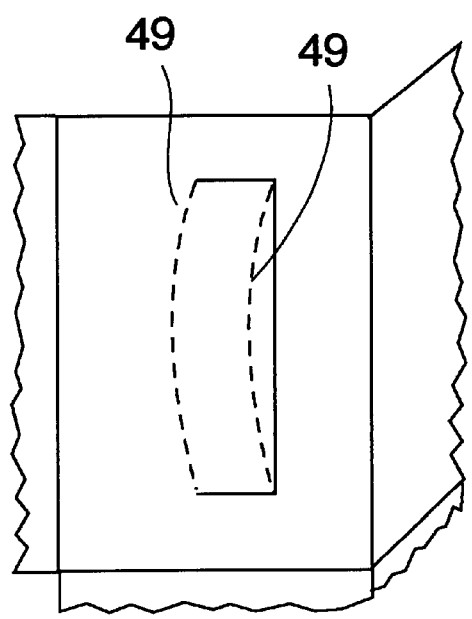
FIG. 5 shows a plan view of the front of the second card panel of a card of the first embodiment of the invention showing two parallel lines as a perforation pattern.
Figure 6:
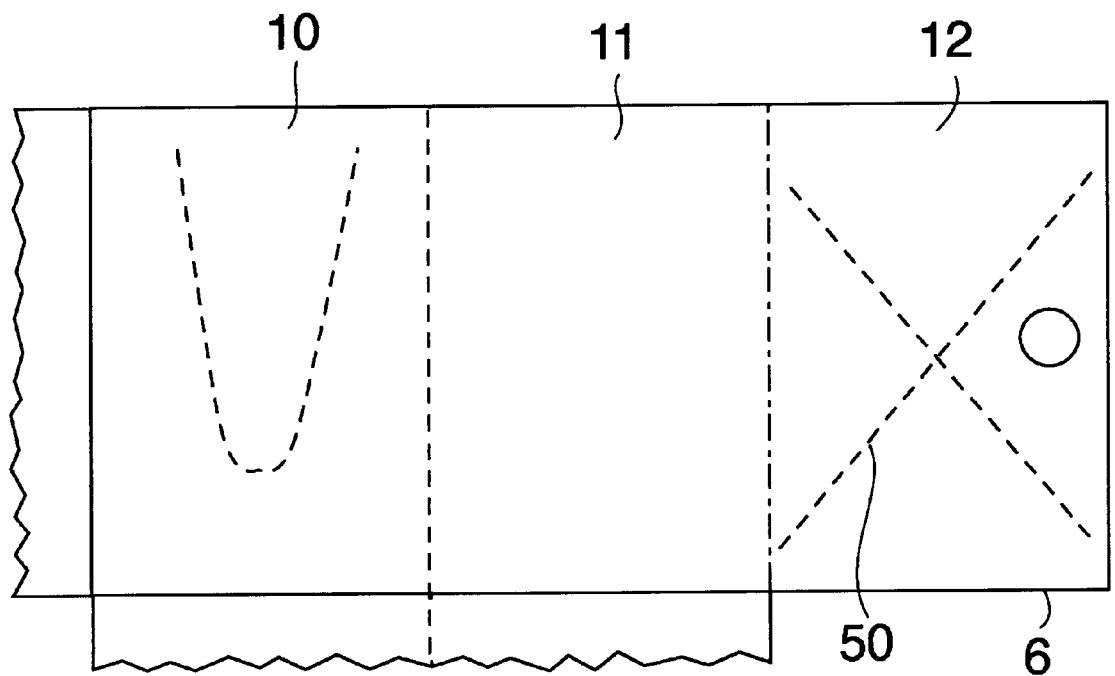
FIG. 6 shows a plan view of the front of the three card panels of a card of the first embodiment showing a V-shaped perforation pattern, an X-shaped perforation pattern and an opening for mounting on a display rack.
Figure 7:
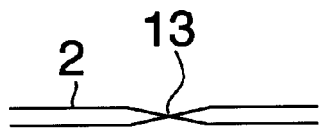
FIG. 7 is an enlarged cross-sectional view showing a foldable connection between two card members for use in the first and third embodiments of this invention.
Figure 8:
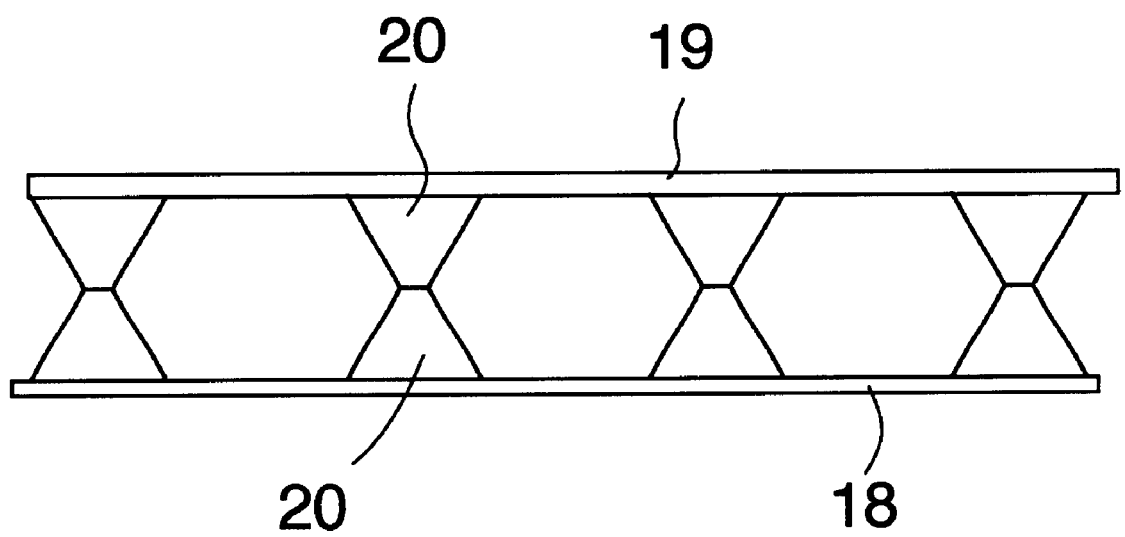
FIG. 8 shows a cross-sectional view of a card panel of the first and third embodiments of the invention showing a bottom cover, a top cover, and abutting nibs.
Figure 9:
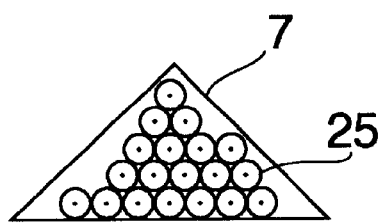
FIG. 9 shows a top view of a sound brush portion of a card according to this invention.
Figure 12:
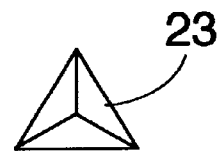
FIGS. 11 through 15 are top elevational views of projections suitable in the sound brushes located on the surfaces of cards of the present invention.
Figure 10:
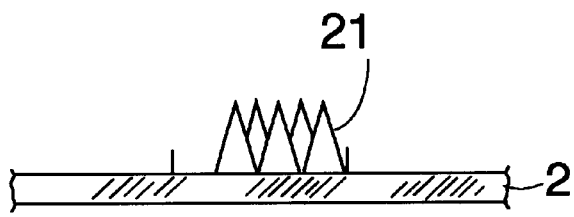
FIG. 10 shows a side view of a portion of a card containing a sound brush on a surface of the card.
Figure 13:
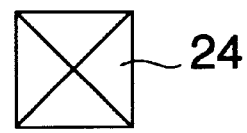
Figure 14:
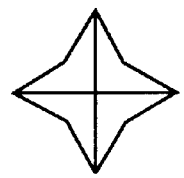
Figure 11:
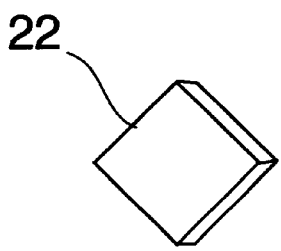
Figure 15:
Figure 18:
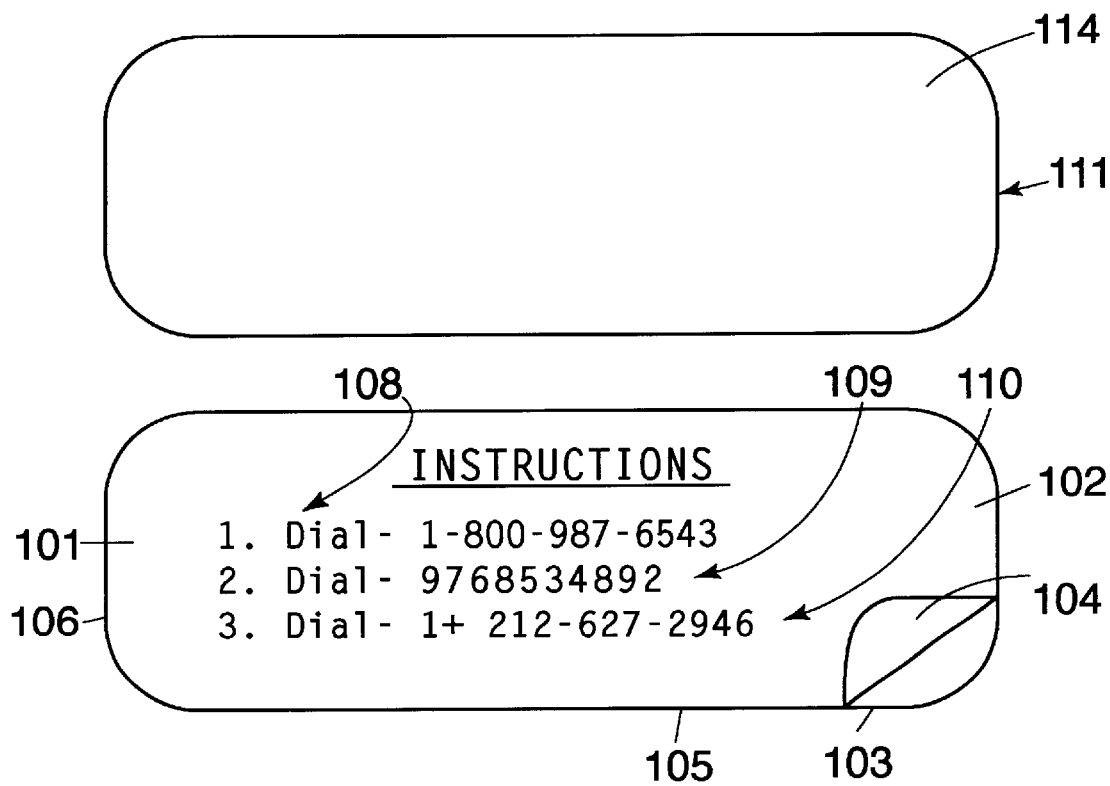
FIG. 18 is a top elevational view showing the bottom surface of the opaque security strip and the top surface of the strip containing directions in the second embodiment of this invention.
Figure 19:
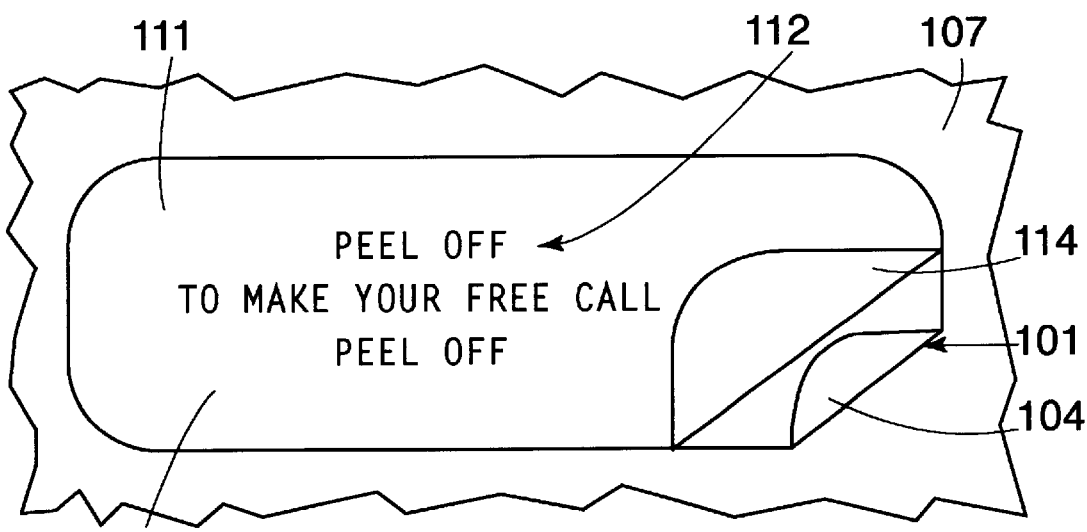
FIG. 19 is a top elevational view of the elements of the second embodiment of this invention showing the assembled strips of FIG. 18 in place on a sheet of correspondence.
Figure 20:
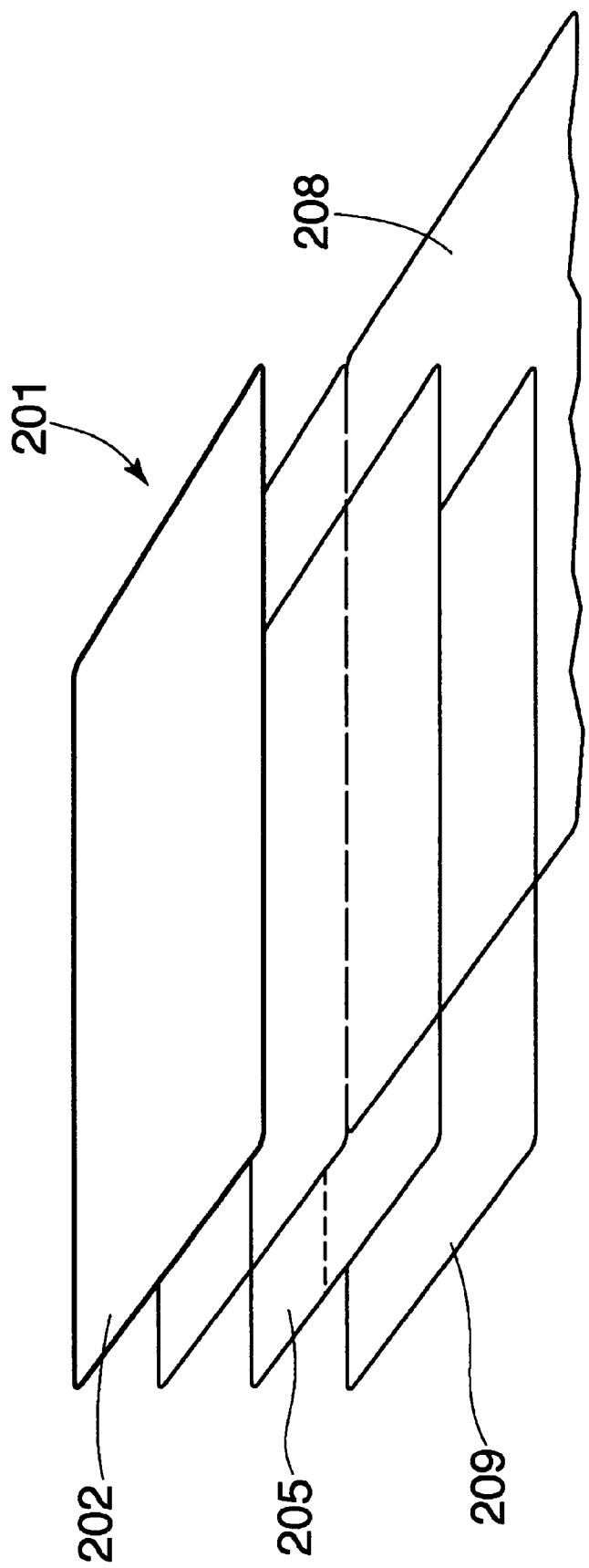
FIG. 20 is an exploded view showing the components of a card of the third embodiment of the invention.
Figure 21:
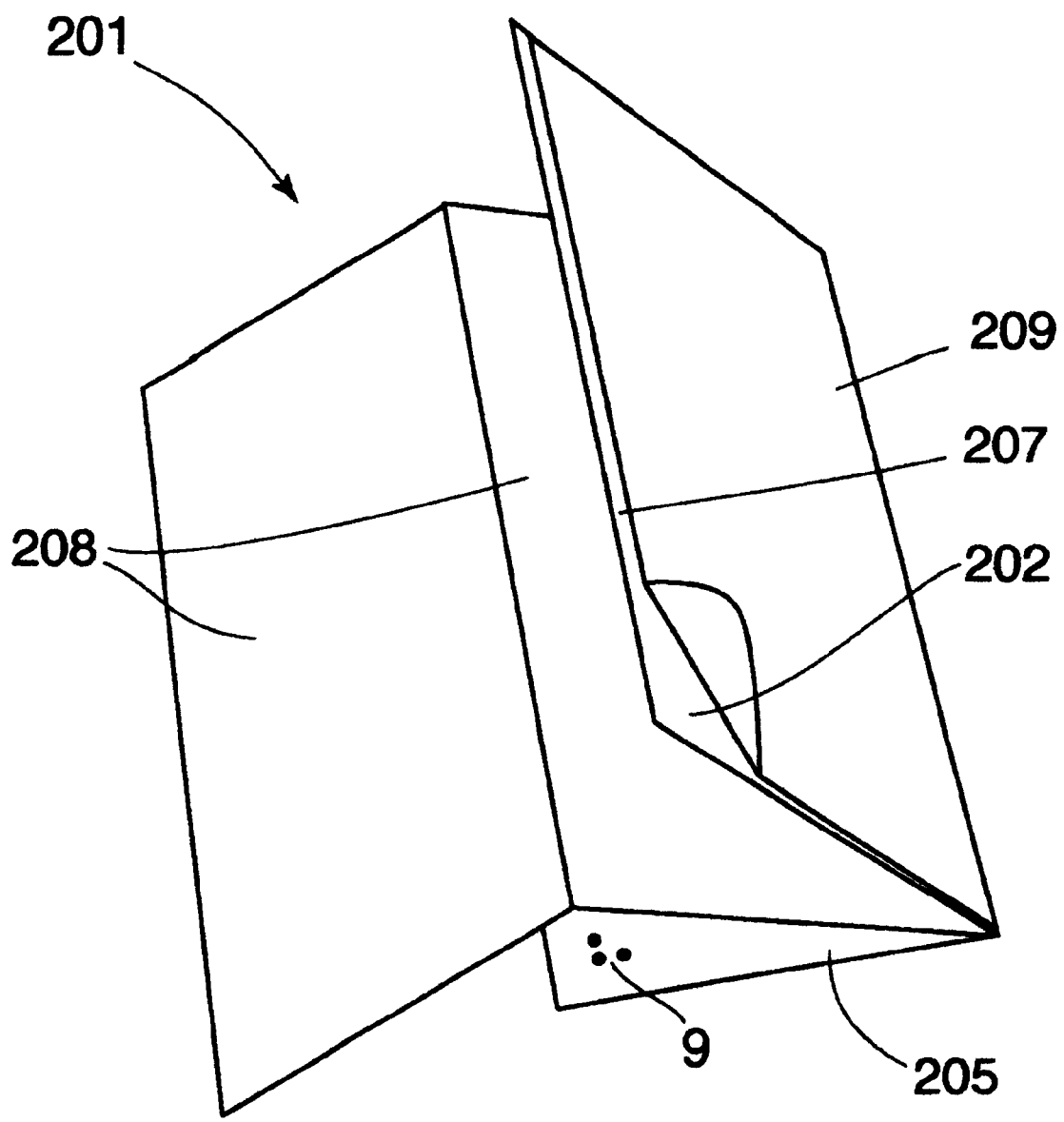
FIG. 21 is an elevational perspective view showing the rear aspect of a card of the third embodiment of this invention.
Figure 22:
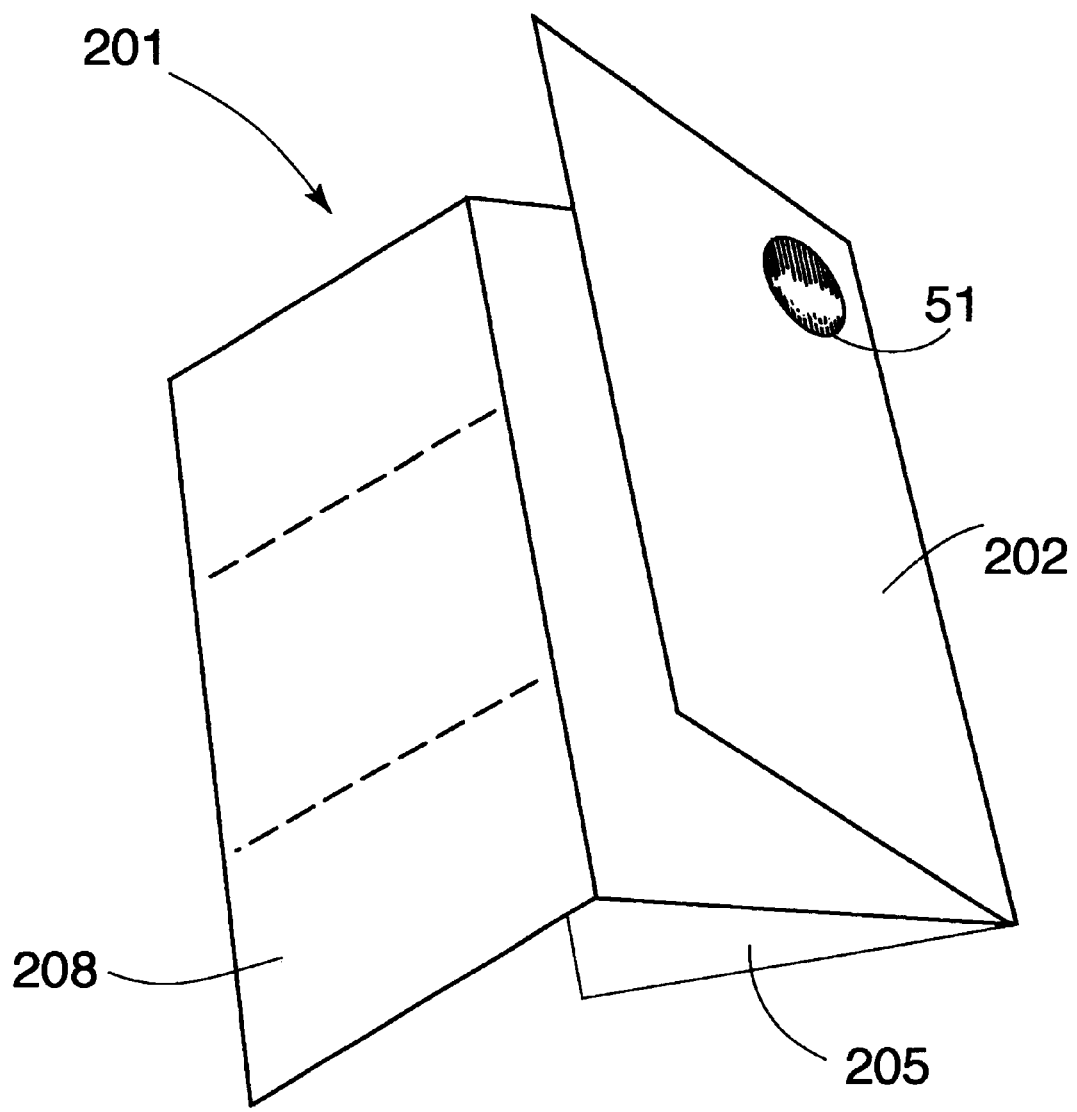
FIG. 22 is an elevational perspective view showing the front aspect of a card of the third embodiment of this invention.
Figure 23:
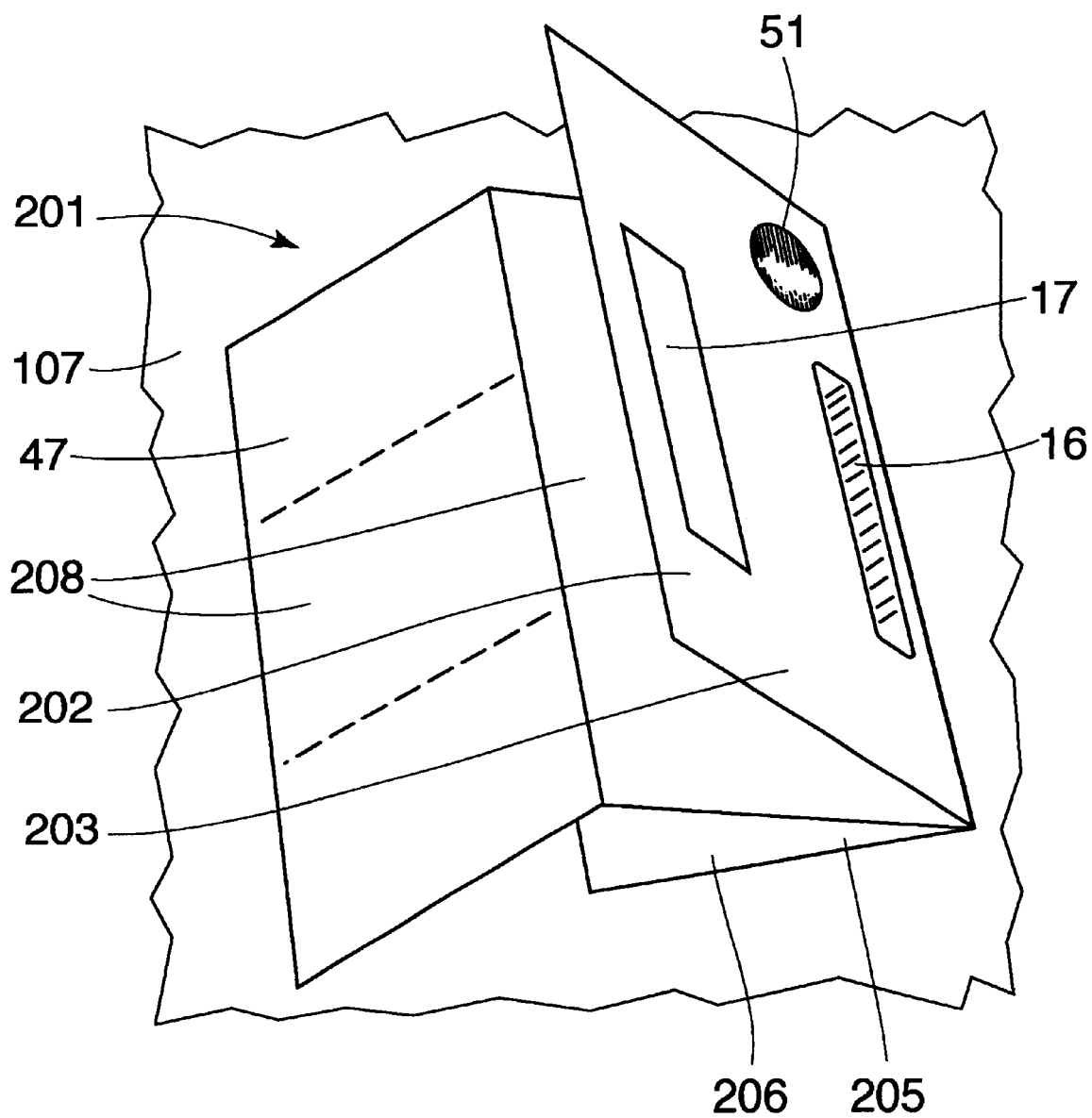
FIG. 23 is an elevational perspective view showing the front of a card of the third embodiment of this invention applied to a sheet of correspondence.

The invention will now be described with reference to the above-mentioned drawing, like numerals referring to like features throughout the description.

The telephone calling card 1 of the first embodiment of present invention may contain one, two or three card panels 2.

In a first example, a single card panel 2 is present, which card panel 2 contains a front surface 3, a rear surface 4, opposing side edges 5, and opposing end edges 6. A sound brush 7, a printed personal identification number 8 (preferably in figures of alternating black and shades of gray) and a personal identification number in tactile form 9 are present on the front surface 3. Additional features, such as the provider's logo 51, are in tactile form.

In a second example, first 10 and second 11 card panels 2 are present. Each panel contains a front surface 3, a rear surface 4, opposing side edges 5, and opposing end edges 6. The card panels 2 are foldably attached along their mutual side edge 5. The first card panel 10 contains a sound brush 7 on the front surface 3 thereof. The second card panel 11 contains a printed personal identification number 8 (preferably in figures of alternating black and shades of gray) and a personal identification number in tactile form 9 on the front surface 3 thereof Alternatively, a sound brush 7 may be present on the front surface 3 of each of the first 10 and second 11 card panels and so arranged so that when the first 10 and second 11 card panels are closed upon themselves, the sound brushes 7 will abut.

An additional location for the sound brush 7 is on a curved corner 52 of a card panel 10 12 202.

In a third, and preferred, example of the multiple purpose telephone calling card 1 of the present invention, first 10, second 11, and third 12 card panels are present. Each card panel 2 contains a front surface 3, a rear surface 4, opposing side edges 5, and opposing end edges 6. The first 10 and second 11 card panels are foldably connected at their mutual side edge 5 and the second 11 and third 12 card panels are foldably connected at their mutual side edge 5. Any known method of foldably connecting the card panels 2 is contemplated, however in the preferred embodiment all three card panels 2 are manufactured from a single piece of material and the card panels 2 are thicker than the foldable connection 13. This difference in thickness is caused by pressure on the foldable connection 13 during manufacture and allows for ease in the folding process. Alternatively, the card panels 2 may be made from single panels folded along perforated lines.

The third card panel 12 contains a hole 14 which is near the unattached side 5 and about midway between the opposing end edges 6. This hole 14 allows for increased visibility and easy access when the card 1 is held on a display rack of a retail establishment.

The first 10, second 11, and third 12 card panels will fold over each other. More specifically, the front 3 of the first 10 and second 11 panels fold together and the front 3 of the third card panel 12 folds to abut the rear surface 4 of the first card panel 10. Foldout panels 15, described below, fold together and fit between the front surfaces 3 of the first 10 and second 11 card panels.

The card 1 may also be dispensed from machines. For this purpose, the card contains a magnetized strip 16 along the free end edges 6 of the first 10 and second 11 card panels. This magnetized strip 16 contains the coding for amount of the value of the card 1. The value of the card 1 may be periodically increased by known methods, thereby extending the life of the card 1. The card 1 preferably contains a barometric weather strip 17 which indicates barometric pressure. Users can thereby be aware of changes in the barometric pressure, and can anticipate changes in the weather. Such strips 17 are conventional in the art as applied to other bases.

The telephone calling card 1 of the present invention contains a personal identification number 8 to be used to identify the user. For increased security, this number 8 is located on the front surface 3 of the second card panel 11. The personal identification number 8 may thus be shielded from the view of bystanders by the inward folding of the first 10 and third 12 card panels. For increased security, the figures in the personal identification number 8 are printed in alternating black and gray shades. This makes it virtually impossible for anyone except the user to read the personal identification number 8. In addition to having the personal identification number 8 printed or embossed on the second card panel 11, it is also presented in tactile form 9 such as Braille to allow use by those who are visually handicapped. Although the location of this tactile information 9 is critical, it is preferred that it be located on the second card panel 11. As the below-described foldout panels 15 are made of strong, thin paper, a visually handicapped user can use these areas to hold additional tactile information.

In a preferred embodiment, the card panels 2 are made of biodegradable vinyl plastic, biodegradable polyester plastic, cardboard, or strong paper. In order to conserve materials, each card panel 2 has a bottom cover 18, a top cover 19 and a plurality of strength-providing abutting nibs 20. In this way, the central space may be largely hollow, thus providing a saving of raw materials. the manufacture of card panels 2 of this configuration is simple. Bottom 18 and top 19 covers are provided with nibs 20, preferably by molding. The nibs 20 are then adhesively permanently connected to form a card panel 2.

The telephone calling card 1 of the present invention contains at least one sound brush 7. The sound brush 7 is an area established on the card 1 at the time of manufacture. This can be done by means known in the art, such as embossing or stamp cutting. When one sound brush 7 is employed, its location is not critical, and it is preferred that it be located on the front surface 3 of the first card panel 10. Alternatively, for simplicity of manufacture, the sound brush 7 may be located on a curved corner 52 of a card 1. When two sound brushes 7 are used, it is preferred that they be located on the front surfaces 3 of the first 10 and second 11 card panels in such a position that they will touch each other when these two card panels 2 are folded together. A single sound brush 7 may be activated by swiping the brush 7 along a hard surface. The surface of choice is the perforations of a telephone mouthpiece. When two sound brushes 7 are used, activation may be brought about by pressing the two opposing brushes 7 together to form a unique sound characteristic of the brushes. This sound produced by the sound brush 7 being activated is received by the telephone carrier. The telephone carrier company has a library of recorded sounds to ascertain that the received sound is produced by a card issued by the carrier. Then, in cooperation with the personal identification number 8, the phone card carrier company allows the user to place a prepaid call. This combination of identifying factors adds security to the card 1 of the present invention as a call cannot be placed if the personal identification number 8 is used alone. The advantages of having the sound brush 7 located on the upper left rounded corner 52 of the card 1 are simplicity of manufacture, visually impaired users can readily identify the card 1 and the orientation of the card 1, and it focuses attention on the logo 51.

In use, when a telephone calling card 1 of the present invention is purchased, the owner contacts the telephone card carrier company. The name of the owner and the personal identification number 8 are given to the company. Additionally, the sound brush 7 is activated to produce a sound which is recorded, preferably on software, by the company. Later, when the owner desires to make a call, the carrier company is dialed, the sound brush 7 is activated to obtain clearance to enter the personal identification number 8, and the personal identification number 8 is entered. In this way, the sound brush 7 and personal identification number 8 serve in combination to increase the security of the calling card 1.

There is nothing distinctive about the tone of the sound given off by the sound brush 7. The sound is a clicking sound. However, depending upon the configuration of the projections 21 which make up the sound brush 7, the sound of the clicks is unique and can be identified by the card carrier company as sounds produced by sound brushes 7 produced by the card carrier company. Configurations resulting in distinct sounds are cubes 22, tetrahedrons 23, pyramids 24, cones 25, cylinders, wedges 26, and other solid polygons. When the sound brush 7 is placed on the rounded corner 52 of a card, the peaks 53 and valleys 54 preferably form wedges, although truncated wedges or hexahedrons are operable. When wedges are used, the distance between adjoining apexes may be within the range of $\frac{1}{16}$ to $\frac{1}{32}$ of an inch. In this way, the combination of the sound brush 7 and the personal identification number 8 serves to positively identify the owner. Thus, the unauthorized use of a personal identification number 8, when used alone, is avoided.

Another feature of the card 1 of the present invention is the presence of a first foldout panel 15. In the preferred embodiment, a first foldout panel 27 contains a plurality (preferably four) foldout members 28. Each member 28 of the first foldout panel 27 contains a front surface 29, a rear surface 30, two opposing end edges 31, and two opposing side edges 32. The first 33 and second 34 foldout members are adhesively attached at their end edges 31 to the end edges 6 of the first 10 and second 11 card panels, respectively. Any permanent glue or cement is suitable for this purpose, with preference given to acrylic cements. The first 33 and second 34 foldout members are also foldably connected to each other at their mutual side edge 32. Third 35 and fourth 36 foldout members of the first foldout panel 27 are foldably connected to each other at their mutual side edges 32 and are foldably connected to the first 33 and second 34 foldout members respectively at their mutual end edges 31. The members 33 34 may be may be made foldable by having the foldable connection compressed as with the card panels 2 or by the presence of scoring along the foldable abutment line.

An additional feature of the telephone calling card 1 of the present invention is the presence of a second foldout panel 37. This panel 37 comprises a plurality (preferably four) foldout members 38. Each foldout member 38 contains a front surface 39, a rear surface 40, two opposing end edges 41, and two opposing side edges 42. A side edge 42 of the first foldout member 43 is adhesively foldably attached to the side edge 5 of the first card panel 10 which is not otherwise attached. As above, this attachment may be done with any acceptable glue or cement. A side edge 42 of the second foldout member 44 is foldably connected to the side edge 42 of the first foldout member 43. A side edge 42 of a third foldout member 45 is foldably attached to a side edge 42 of the second foldout member 44, and the side edge 42 of a fourth foldout member 46 is foldably connected to the free side edge 42 of the third foldout member 45. As above, these foldout members are made of a single sheet and foldability is accomplished by compressing or scoring along the foldable lines of abutment. Foldout members 28 38 may contain coupons 47.

The foldout panels 27 37 are manufactured from thin, strong materials, preferably biodegradable vinyl plastic, biodegradable polyester, or paper. These panels 27 37 allow for an area which is available for information, which area is a multiple of the size of the telephone calling card 1. Since these panels 27 37 fold together and fit between the first 10 and second 11 card members, these foldout panels 27 37 are securely out of sight when the card 1 is in its closed position. Since each panel 27 37 contains a front 29 39 and rear 30 40 surface, the area available for information in a foldout member 28 38 is twice the area of the foldout member 28 38. A number of these members 28 38 may contain advertisements or coupons 47 applied when the cards 1 are manufactured or at a later time. At least a majority of the members 28 38 are for the purpose of containing identification or other information generated by the user, such as telephone numbers, addresses, etc.

The telephone calling card 1 of the present invention has a utility following its use as a calling card.

By virtue of a V-shaped perforation 48 in one card member 2, that member 2 finds utility as a book mark. Another card member 2 contains two parallel perforations 49 parallel to the side edges 5. When opened, a curved opening is presented. Because the card 1 is designed to have an attractive appearance, this card member 2 finds utility as a holder for a pony tail. A third card member 2 contains an X-shaped perforation 50 which, when opened, finds utility as a holder for notes or paper currency. The perforations can be made by known methods, preferably stamping.

In a second preferred embodiment of this invention, a strip 101 having a front surface 102, a peelable strip 103 on an adherent back surface 104, two opposing sides 105, and two opposing ends 106 is adhered to a sheet of correspondence 107 by the adherent back surface 104. The front surface 102 of the strip 101 contains the telephone number of the telephone carrier and operator 108, the unique personal identification number 109 for the strip 101, and the telephone number 110 of the sender of the sheet of correspondence 107. For security purposes, the front surface 102 of the strip 101 is covered by an opaque peelable adherent label 111, which may contain instructions 112 on its front surface 113 and an adherent substance (not shown) on its back surface 114. By sending a strip 101 containing information as to how the receiver may contact the sender by telephone with no cost to the receiver, the sender gives impetus to the receiver to contact the sender. Thus, students at college or family members or friends in the armed services would welcome the opportunity to call the sender at no cost. This strip 101 may also be used for business purposes. For use by the visually handicapped, the strip 101 contains the instructions in tactile form, such as Braille. Also, in this and the other embodiments, written instructions are set forth in bold letters which are as large as practical so that those who are visually handicapped, but not blind, can read the instructions.

Alternatively, a card 201 to be attached to a sheet of correspondence 107 may be a multiple-panel, multiple-purpose card 201. In this event, the card 201 has the properties of a gift, has a set money value, and specific directions for making the call are not needed.

In a third preferred embodiment, a multi-panel, multiple purpose telephone calling card 201 may be used as a separate unit as in the first preferred embodiment or may be attached to a sheet of correspondence 107 as in the second preferred embodiment. The card 201 of this embodiment contains a front panel 202 having front 203 and back 204 surfaces, a rear panel 205 having front 206 and rear 207 surfaces, foldout members 208, and a peelable strip 209 adhered to the rear surface 207 of the rear panel 205.

The front panel 202 and the rear panel 205 are made from a single sheet of material, folded along the line of abutment 210. The line of abutment 210 between the front and rear panels may be facilitated by perforating or pressing to decrease the thickness of the material at the line of abutment 210. The use of a single sheet rather than two separate sheets joined together saves a manufacturing step and manufacturing materials. The foldout members 208 attach to the card 201 at the line of abutment 210 between the front panel 202 and the rear panel 205 or at a line of abutment 211 on either the front panel 202 or rear panel 205 slightly removed from the line of abutment 210 between the front 202 and rear 205 panels. Attachment may be accomplished by adhesives 212, preferably acrylic cements.

The card 201 contains a sound brush 7 on the front surface 203 of the front panel 202. Alternatively, the sound brush 7 may be located on a rounded corner 52 of the card 201. It is preferable that both front 202 and rear 205 panels be stamped in preparing the sound brush 7 in this alternative. However, if desired, only the front panel 202 may be stamped.

The card 201 also contains a printed personal identification number 8 and a tactile identification number 9, preferably on the back surface 204 of the front panel 202. All printed instructions are in bold characters which are as large as feasible to aid the visually impaired. The logo 51 of the carrier company is preferably embossed so that the visually impaired can identify the card by touch. There is a magnetic strip 16 and a barometric weather strip 17 on the front surface 203 of the front panel 202.

The foldout members 208 contain coupons 47, advertisements, and room for adding information.

As an added utility of the card 201 the peelable strip 209 has luminescent ink printed over the surface thereof The card 201 may be seen at night. This feature aids in finding the card 201 or in signaling for aid along a darkened highway.

The card 201 is made of biodegradable vinyl plastic, biodegradable polyester plastic, paper, or cardboard.

The above description has been presented for the purpose of informing those skilled in the art how to make and use the present invention. This description is not intended to limit the scope of the present invention so as to exclude obvious modifications. Rather the scope of the invention is intended to be limited to the scope of the following claims, including all equivalents and immaterial modifications.

I claim:

1. A telephone calling card comprising:
    A) at least one card panel, each card panel containing a front surface, a rear surface, two opposing end edges, and two opposing side edges,
    B) at least one sound brush on at least one card panel, which sound brush contains a plurality of raised solid geometric projections which, when activated, emit a series of clicks, and C) a personal identification number on a card panel, the sound brush and personal identification number being so related that upon recognition of the series of clicks emitted by the sound brush by a telephone card carrier company, the company will permit the entry of the personal identification number so as to allow the card to be used.

2. The telephone calling card of claim 1, wherein the card contains three card panels, the first and second card panels being foldably connected at their mutual side edge and the second and third card panels being foldably connected at their mutual side edge.

3. The telephone calling card of claim 2, wherein at least one foldout panel is connected to at least one of the first and second card panels, which foldout panels contain a plurality of foldout members and which foldout panels contain at least one of coupons, advertisements, and room for information.

4. The telephone calling card of claim 3, wherein the card contains a first foldout panel containing a plurality of members, each member containing a front surface, a rear surface, two opposing end edges, and two opposing side edges, the first and second foldout members being foldably, adhesively connected at their end edges to adjacent end edges of the first and second card panels respectively, the first and second foldout members also being foldably connected to each other at their mutual side edges; third and fourth foldout members of the foldout panel are foldably connected by their mutual end edges to the first and second foldout members of the foldout panel respectively and are foldably connected to each other at their mutual side edges.

5. The telephone calling card of claim 4, comprising a second foldout panel containing a plurality of foldout members, each foldout member containing a front surface, a rear surface, two opposing end edges, and two opposing side edges; a side edge of the first foldout member being adhesively foldably connected to the side edge of the first card panel which is not otherwise attached; a side edge of the second foldout member is foldably connected to the free side edge of the first foldout member; a side edge of the third foldout member is foldably connected to the free side edge of the second foldout member; and the side edge of a fourth foldout member is foldably connected to the free side edge of the third foldout member; the foldout members containing, or being available to contain, information.

6. The telephone calling card of claim 2, wherein one sound brush is located on the front surface of the first card panel and a second sound brush is located on the second card panel at such a point that when the phone card is closed, the two sound brushes will abut.

7. The telephone calling card of claim 2, wherein information in tactile form is located on the front surface of the second card panel.

8. The telephone calling card of claim 2, wherein a V-shaped perforated line or a pair of perforated lines parallel to the side edges or an X-shaped perforated pair of lines is on a card panel.

9. The telephone calling card of claim 2, wherein a circular opening for a display hanger is on the third card panel near the unattached side edge.

10. The telephone calling card of claim 2, wherein a magnetic strip is on the front surface of the first and second card panels.

11. The telephone card of claim 2, wherein a barometric weather strip is on the front surface of the first and second card panels.

12. A telephone calling card comprising:

A) at least one card member, each card member containing a front surface, a rear surface, two opposing end edges, and two opposing side edges, and B) a unique personal identification number embossed in Braille tactile form on the front surface of a card panel wherein a V-shaped perforated line or a pair of perforated lines parallel to the side edges or an X-shaped perforated pair of lines is on a card panel.

13. The telephone calling card of claim 12, wherein the card contains three card panels, the first and second card members being foldably connected at their mutual side edge and the second and third card panels being foldably connected at their mutual side edge.

14. The telephone calling card of claim 13, wherein at least one foldout panel is connected to at least one of the first and second card members, which foldout panels contain a plurality of foldout members.

15. A telephone calling card comprising:

A) a front panel having a front surface and a back surface;

B) a rear panel having a front surface and a rear surface, said front and rear panels being made of a single sheet of material;

C) a plurality of foldout members, which foldout members contain at least one of coupons, advertisements, and room for additional information;

D) a personal identification number in Braille; and

E) a peelable strip adhered to the rear surface of the rear panel, which card has a sound brush on a curved corner of the card.

\* \* \* \* \*

UNITED STATES PATENT AND TRADEMARK OFFICE
CERTIFICATE OF CORRECTION

PATENT NO.   : 6,375,080 B1
DATED        : April 23, 2002
INVENTOR(S)  : Cremonese It is certified that error appears in the above-identified patent and that said Letters Patent is hereby corrected as shown below:

Column 2,
Line 28, amend "fines" to read -- lines --.

Column 4,
Line 27, amend "thereof" to read -- thereof. --.

Column 5,
Line 23, amend "is" to read -- is not --.

Signed and Sealed this

Twenty-fourth Day of September, 2002

Attest:

Attesting Officer

JAMES E. ROGAN
Director of the United States Patent and Trademark Office